United States Patent [19]

Leiber

[11] 4,033,637

[45] July 5, 1977

[54] ANTI-LOCK REGULATING SYSTEM

[75] Inventor: Heinz Leiber, Leimen, Germany

[73] Assignee: Teldix GmbH, Heidelberg, Germany

[22] Filed: Dec. 17, 1975

[21] Appl. No.: 641,758

[30] Foreign Application Priority Data

Dec. 18, 1974   Germany .......................... 2459775

[52] U.S. Cl. ................................. 303/115; 303/10
[51] Int. Cl.$^2$ ........................................ B60T 8/06
[58] Field of Search ............... 303/10, 61, 62, 106, 303/111, 115, 116, 119; 188/181 R, 181 A, 181 C

[56]   References Cited
   UNITED STATES PATENTS

| | | | |
|---|---|---|---|
| 3,535,004 | 10/1970 | Howard et al. ..................... | 303/111 |
| 3,671,085 | 6/1972 | Pasek et al. ......................... | 303/115 |
| 3,724,915 | 4/1973 | MacDuff ............................. | 303/115 |
| 3,726,567 | 4/1973 | Burckhardt ........................ | 303/119 |
| 3,729,233 | 4/1973 | Mangold ............................ | 303/119 |
| 3,790,227 | 2/1974 | Dozier ............................... | 303/106 |
| 3,832,009 | 8/1974 | Leiker et al. ....................... | 303/111 |
| 3,874,745 | 4/1975 | Peruglia et al. ................... | 303/116 |
| 3,918,767 | 11/1975 | Reinecke ............................ | 303/119 |
| 3,942,844 | 3/1976 | Inada et al. ......................... | 303/114 |

*Primary Examiner*—Trygve M. Blix
*Assistant Examiner*—Edward R. Kazenske
*Attorney, Agent, or Firm*—Spencer & Kaye

[57]   ABSTRACT

An anti-lock regulating system for brakes associated with wheels, has a first brake circuit including the brake of at least one wheel; a braking pressure regulating device for altering the braking pressure when the wheels have a tendency to lock; a hydraulic braking pressure generator coupled to the first brake circuit through the braking pressure regulating device; a second brake circuit including the brake of at least one other wheel; and a hydraulic control valve connecting the second brake circuit with the hydraulic braking pressure generator. The hydraulic control valve has a normally open position and a closed position. There is further provided a control piston having opposite first and second faces. The first face of the control piston is exposed to a pressure $P_R'$ which is dependent from the braking pressure $P_R$ prevailing in the second brake circuit. Further, a control chamber bounded by the second face of the control piston is connected to the braking pressure regulating device through a throttle. The second face of the control piston is exposed to a pressure $P_{St}'$ which is dependent, through the throttle, from the pressure $P_{St}$ as set by the braking pressure regulating device. The control piston, which is connected to the hydraulic control valve, is, in response to a predetermined ratio $P_R'/P_{St}'$ on the control piston faces, displaced for first closing the control valve and subsequently, as a result of a continuing displacement, effecting an increase in the volume accommodating hydraulic fluid between the control valve and the wheel brake associated with the second brake circuit.

13 Claims, 7 Drawing Figures

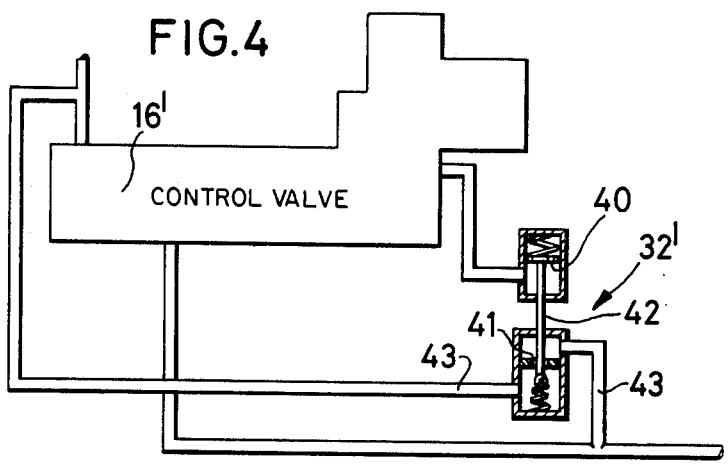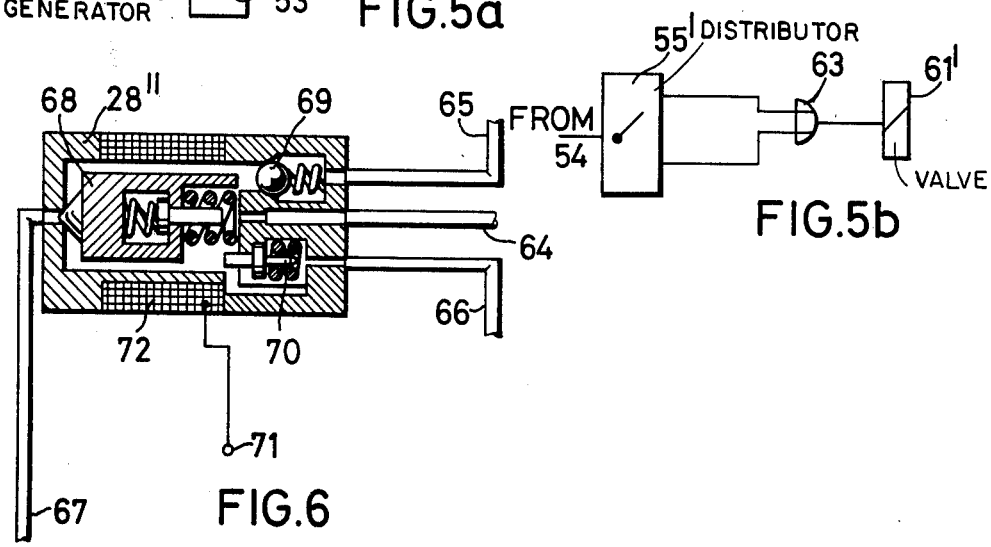

ANTI-LOCK REGULATING SYSTEM

BACKGROUND OF THE INVENTION

This invention relates to an anti-lock regulating system in which a first braking pressure generator is operative in a first brake circuit and is controlled by a braking pressure regulator which varies the braking pressure when the wheels to be braked show a tendency to lock.

SUMMARY OF THE INVENTION

It is an object of the invention to provide an improved anti-lock regulator of the above-outlined type which is of simplified construction.

This object and others to become apparent as the specification progresses are accomplished by the invention according to which, briefly stated, the anti-lock regulating system for brakes associated with wheels, has a first brake circuit including the brake of at least one wheel; a braking pressure regulating device for altering the braking pressure when the wheels have a tendency to lock; a first hydraulic braking pressure generator coupled to the first brake circuit through the braking pressure regulating device; a second brake circuit including the brake of at least one other wheel; and a hydraulic control valve connecting the second brake circuit with the hydraulic braking pressure generator. The hydraulic control valve has a normally open position and a closed position. There is further provided a control piston having opposite first and second faces. The first face of the control piston is exposed to a pressure $P_R'$ which is dependent from the braking pressure PR prevailing in the second brake circuit. Further, a control chamber bounded by the second face of the control piston is connected to the braking pressure regulating device through a throttle. The second face of the control piston is exposed to a pressure $P_{St}'$ which is dependent, through the throttle, from the pressure $P_{St}$ as set by the braking pressure regulating device. The control piston, which is connected to the hydraulic control valve, is, in response to a predetermined ratio $P_R'/P_{St}'$ on the control piston faces, displaced for first closing the control valve and subsequently, as a result of a continuing displacement, effecting an increase in the volume accommodating hydraulic fluid between the control valve and the wheel brake associated with the second brake circuit.

It is feasible to provide a common pressure generator for both brake circuits; it is preferred, however, to use two pressure generators, such as two master cylinders of known structure or two brake pressure control valves in full power brakes.

For a throttle arrangement a throttle with parallel-connected valve or any other similarly-operating arrangement may be used, such as a piston which is exposed to the pressure prevailing upstream and downstream of the throttle and the position of which affects a throttle passage. In case of higher pressure in the wheel brake cylinders there occurs an increase in the throttle passage so that there is effected a more rapid pressure reduction and in case of smaller pressure in the wheel brake cylinders there is effected a decrease in the throttle cross-section and thus a slower pressure build-up takes place. The throttle opening may be varied in such a manner that the pressure changes are independent from the pressure; consequently, the pressure changes are linear with respect to time.

The braking pressure regulating device may be designed in such a manner that in one of the two brake circuits the pressure is maintained at a constant value, while a pressure drop is effected in the other circuit. For this purpose, a multi-position valve is used as the regulator valve which is designed in such a manner that in a first position it connects the outlet of the first pressure generator, particularly a brake master cylinder, with the first brake circuit and, through the throttle, with the control chamber of the control piston; in a second position it blocks communication with the first pressure generator and establishes communication between the above-mentioned control chamber and a return (discharge) conduit; and in a third position connects additionally or exclusively the first brake circuit with the return conduit. Preferably, the armature of the multi-position valve includes two shutoff members, of which at least one is displaceable relative to the armature. One of the shutoff members closes the return conduit in the initial position and the other blocks communication with the first pressure generator in the second and third positions. Further, the first brake circuit is attached to the multi-position valve through a one-way valve which permits a pressure build-up therein and which is lifted off its seat in the third position of the multi-position valve.

When the above-outlined multi-position valve is used, there is further utilized a one-way valve arranged between the first circuit and the first master cylinder. This one-way valve effects a pressure reduction in the first circuit upon termination of a braking step. In order to maintain the pressure constant also in the second circuit during pressure reduction in the first circuit (third position), the control chamber of the second circuit is connected to the multi-position valve through an additional valve which is normally in an open position, but which is closed in the third position of the armature of the multiposition valve.

In the system according to the invention there may be provided a parallel channel with a normally open bypass valve; this channel connects the second pressure generator and the second brake circuit. The bypass valve is closed only during regulation, so that operation during regulation occurs with a smaller pressure gradient. This bypass valve may be a hydraulic valve and may be closed by the brake fluid that is returned during regulation.

The invention may also find application in systems in which a hydraulic energy source (for example, a pump-and-pressure vessel unit) is used for brake actuation. In this case, in the connecting conduits leading from the two pressure generators to the brakes there is inserted a separate hydraulic control valve and the control pistons of the two control valves are exposed, on the one hand, to the pressure dependent on the pressure in the associated brake circuit and, on the other hand, to a pressure which depends upon the pressure of the hydraulic energy source, as set by the pressure regulating device. The last-named pressure affects the control piston of the first brake circuit directly and the second brake circuit through a throttle device, for example, a throttle with a parallel-connected one-way valve.

In the above-outlined arrangement as well as in an arrangement with a control valve there may be used at least one safety piston which is exposed to the pressure of the hydraulic energy supply means or, as the case may be, the pressure of the first brake circuit. In case this pressure disappears, the safety piston moves outwardly and, as a result, maintains a valve, for example, the control valve or control valves, open by means of a mechanical connection.

The hydraulic control valve may further be bridged (short-circuited) by a parallel conduit which is normally closed by a valve and, further, there is provided a movable partition exposed to the braking pressure in the regulated circuit. When this braking pressure drops to zero, the partition is deflected and, thus, by means of a coupling mechanism, it maintains open the valve in the parallel conduit.

The invention may find application in vehicles in which the wheel brakes of diagonally opposite wheels or wheels of the same axle are combined in one circuit. In the latter case, either the front wheels or the rear wheels can be associated with the first brake circuit. In all cases preferably the two front wheels are associated with measuring value transmitters for obtaining signals for the braking pressure control. In the case of wheel brake combination by axles, there is additionally provided a third measuring value transmitter, associated preferably with the differential; the two front wheel sensors are used for the regulation in a "select-low" operational mode.

A periodic switch-over to "select-high" operational mode may also take place.

When the multi-position valve or a second control valve is used, the control signals derived from the measuring valve transmitters associated with the individual brake circuits are utilized for the regulation of the associated regulating components or, as the case may be, in the associated control positions.

The measuring value transmitters are preferably connected in a predetermined cadence to a single-channel evaluation circuit which generates the regulating signals. In case the multi-position valve or two regulating valves are used, at the output of the channel there is effected a coordination of the successively generated signals with the brake circuit from which they are derived.

BRIEF DESCRIPTION OF THE DRAWINGS

FIG. 4 shows a valve 32', corresponding to the valve 32 of FIG. 1, in a more detailed representation.

FIG. 5a is a block diagram of an embodiment of the electronic circuit which may be used for pressure variation.

FIG. 5b is a block diagram of a modified detail of FIG. 5a.

FIG. 6 shows, in longitudinal section, an embodiment of a multi-position valve which may be used in connection with the invention.

DESCRIPTION OF THE PREFERRED EMBODIMENTS

Figure 1:
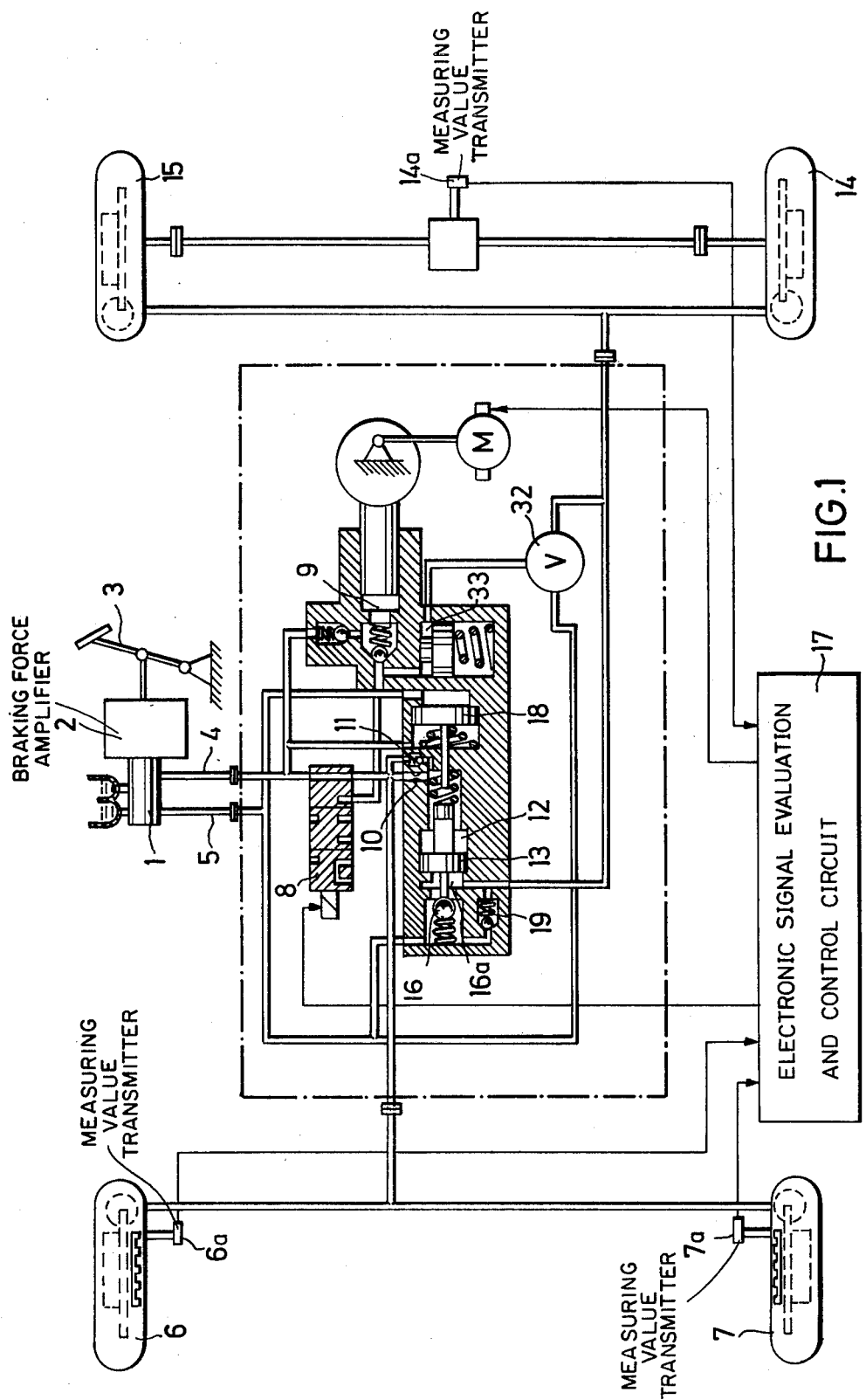
FIG. 1 is a schematic illustration, partially in section, of a preferred embodiment of the invention.

Turning now to FIG. 1, there is shown a tandem master cylinder 1 which is actuated by a brake pedal 3 through a braking force amplifier 2. A first brake circuit 4 coupled to the master cylinder 1 includes the brakes of the front wheels 6 and 7 of a vehicle. A 3-position solenoid valve 8 functions as a pressure regulating valve and, dependent upon its position, may cause the pressure at its output either to increase or to drop or to remain constant. The valve 8 is coupled to the brake conduit leading to the front wheels 6 and 7. The valve 8 regulates the braking pressure as a function of signals applied to its solenoid by measuring value transmitters. A first output of the valve 8 is connected with a cylinder chamber 12 through a throttle 10 and a valve 11 which is connected parallel with the throttle and which permits a rapid depressurization of the cylinder chamber 12. In this manner, a control piston 13, received for reciprocation in the cylinder chamber 12, is exposed to a pressure $P_{St}'$ dependent upon a pressure $P_{St}$ which appears at the output of the valve 8 and which builds up through the throttle 10. A second output of the valve 8 is connected with a fluid return pump 9.

To an output of the master cylinder 1 there is coupled a second brake circuit 5 which includes the brakes of the two rear wheels 14 and 15. In this circuit there is arranged a hydraulic control valve 16 which is maintained open by the piston 13 in its position shown. The piston 13 is exposed at its left side (as viewed in FIG. 1) to a pressure $P_R'$ dependent upon a pressure $P_R$ which is applied to the brakes of the wheels 14 and 15 (second brake circuit 5).

With the two front wheels 6 and 7 there are associated measuring value transmitters 6a and 7a, respectively, and with the differential of the rear wheels there is associated a measuring value transmitter 14a. From these measuring value transmitters signals are applied to a conventional electronic signal evaluation and control circuit 17 which should be of the single-channel type and to which the measuring value transmitters are operatively connected in timed sequence. The signals of the measuring value transmitters associated with the front wheels are evaluated by means of a "select-low" operation with a periodic switch-over to a "select-high" operation. By means of the control signals generated, the pressure at the output of the valve 8 is varied. If desired, the longitudinal and transversal acceleration of the vehicle may also be included as a variable in the pressure control operation.

If the pressure $P_{St}'$ in the valve chamber 12 drops with respect to the pressure $P_R'$ in the valve chamber 16a, the piston 13 is caused to be displaced towards the right virtue of the regulation. As a result, the valve 16 is closed and because of a further shift of the piston 13 towards the right, there is further effected a pressure reduction in the second brake circuit 5 (associated with the rear wheels). During the pressure build-up that takes place subsequently at the output of valve 8, there occurs, due to the throttle 10, only a slow pressure build-up in the chamber 12 and thus in the second brake circuit.

The piston 18 is a safety piston which, in case the first brake circuit 4 (associated with the front wheels) is inoperative, prevents a (permanent) closing of the valve 16. A valve 19 which is biased, initiates a pressure build-up at the brakes of the wheels 14 and 15 upon the appearance of a pressure difference of predetermined value.

Instead of the valve 8 a differently arranged multi-stage valve may be used which may, for example, decrease the pressure separately in either circuit, while maintaining the pressure constant in the other circuit (see valve 28 to be described in connection with FIG. 2, and valve 28'' in FIG. 6).

In FIG. 1 there is further shown a bypass shutoff valve 32 which, as long as no regulation takes place, is open and thus short-circuits the valve 16. During regulation, that is, as brake fluid is admitted to the accumulator chamber 33, the valve 32 is closed, so that the pressure build-up occurs only through the slightly throttled path passing through the valve 16. The brake fluid received in the accumulator chamber 33 during regulation is — as may be observed in FIG. 1 — drawn from the accumulator chamber 33 and driven back to the circuit upstream of the valve 8 by the return pump 9. A brake fluid pump and accumulator chamber provided for such a purpose is also disclosed in U.S. Pat. No. 3,521,934 (FIG. 9).

Figure 2:
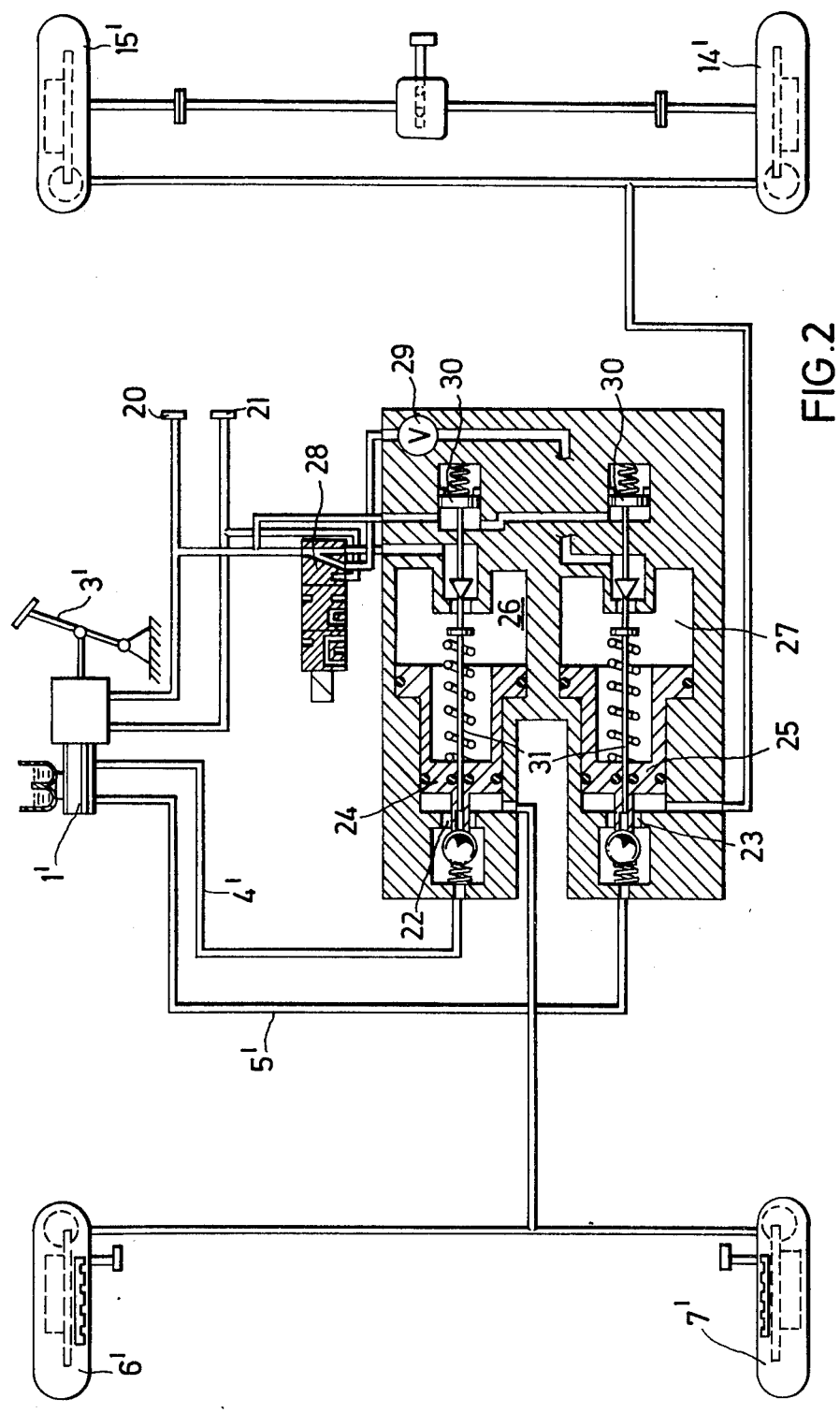
FIG. 2 is a schematic illustration, partially in section, of another preferred embodiment of the invention.

In the embodiment according to FIG. 2, the two master cylinders 1' for the two brake circuits 4' and 5' are actuated with the aid of a hydraulic energy supply means which has its input at 20 and its drainage at 21. The master cylinders 1' are displaced by a pressure controlled by the position of a brake pedal 3'. In the conduits between the master cylinder and the axlewise combined brakes of the wheels 6', 7' and, respectively, 14', 15', there are inserted control valves 22 and 23, the respective control pistons 24 and 25 of which normally maintain the valves 22 and 23 open. The control pistons 24,25 are exposed at one side to the pressures of the combined wheel brakes. In the control chambers 26 and 27 of the pistons 24 and 25, respectively, a pressure prevails which normally corresponds to the pressure of the hydraulic energy supply. During breaking pressure regulation, however, the pressure corresponds at least to the regulated pressure in the control chamber 26 by virtue of the four-port, three-stage valve 28. In the conduit leading to the control chamber 27 there is further inserted a throttle and check valve unit 29 which corresponds to the components 10 and 11 of FIG. 1. In this manner, the valve 28 controls the pressure in the chamber 26 directly and in the chamber 27 in a delayed manner due to the delaying throttle. As a result, there is achieved a mutually independent closing of the hydraulic control valves 22 and 23 and a pressure reduction in the brake circuits by virtue of the displacement of the pistons 24 and 25. The three-stage valve 28 permits an increase of the pressure in both chambers in one of its positions, connects the chamber 27 with a discharge conduit in a second position, and connects the chamber 26 with the discharge conduit in a third position so that a separate pressure reduction is accomplished.

Safety pistons 30 are exposed to the pressure in the hydraulic energy supply and are maintained in the position shown as long as hydraulic pressure prevails. If the energy supply breaks down, the safety pistons 30, by virtue of their excursion towards the left, maintain the valves 24,25 open with the stems 31, so that an emergency braking operation is possible.

Figure 3:
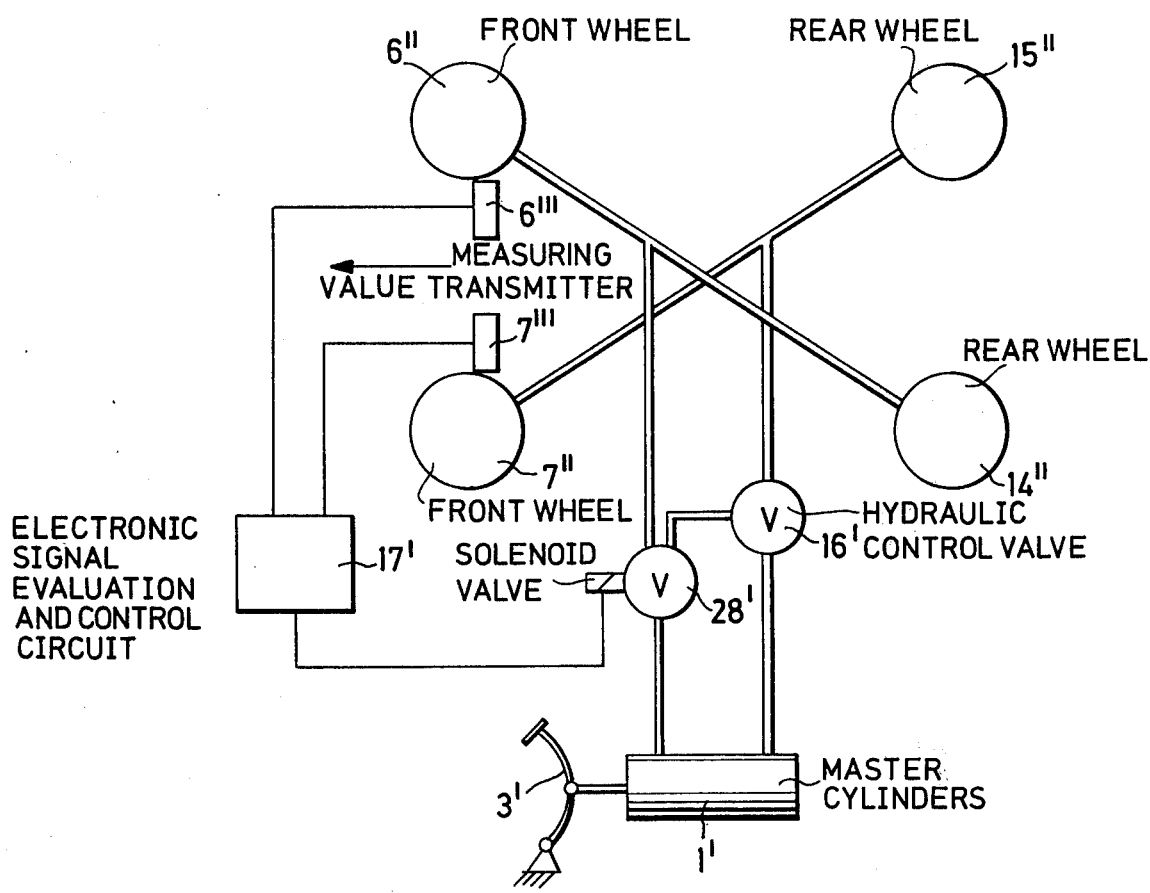
FIG. 3 is a block diagram of the system according to the invention, wherein brakes of diagonally opposite wheels are combined in two brake circuits.

Turning now to FIG. 3, in the arrangement illustrated therein, diagonally opposite wheels 6'' and 14'', on the one hand, and 7'' and 15'', on the other hand, are combined and only the front wheels are associated with measuring value transmitters 6''' and 7'''. The pressure in the one brake circuit is controlled by means of a valve 28' which corresponds, for example, to the valve 28 of FIG. 2. The pressure in the other brake circuit is affected by the valve 28' and the control valve 16', similar to the FIG. 1 arrangement. The measuring value transmitters 6''' and 7'''' control the valve 28' through the evaluating circuit 17'.

In FIG. 4 the assembly including valve 16 is designated 16' and the valve 32 is designated 32'. This valve 32', is shown here in detail, comprises a piston 40 which holds valve 41 open by a stem 42 until fluid in the return line moves the piston 40 upward and thus closes valve 41. This blocks the bypass channel 43 which remains closed until braking is finished.

In FIG. 5a two sensors 50 and 51 are represented, feeding their signals to an electronic switching arrangement 52, which is controlled by the pulse generator 53 and which cyclically connects sensors 50 and 51 to the evaluation circuit 54. The latter evaluates control signals for brake pressure variation in dependance of a locking tendency signalled by the sensor signals. The control signals generated are distributed to two memories 56, by means of a distributor 55, which is actuated in synchronism with the switching arrangment 52. The signals evaluated in circuit 54 are stored in memories 56 each assigned to the one sensor if a new control signal is generated caused by a change in the locking tendency signalled by one sensor; this new control signal is stored in the memory belonging to the said sensor. The outputs of the memories 56 are connected to an AND-gate 58 and an OR-gate 57. The output of the OR-gate 57 is connected to one input of an AN-gate 59. The output of the gates 58 and 59 are connected to an OR-gate 60, the output of which controls a valve 61. Components 56–60 thus form control circuits whose output signal is applied to the valve 61.

If AND-gate 59 is open for signals of the OR-gate 57 by means of a signal at input 62, a locking tendency signalled by one sensor can actuate valve 61; in this case select-low operation is effective. If, however, the AND-gate 59 is blocked, only a locking tendency signalled by both sensors may actuate the valve 61.

In FIG. 5b a modification of the circuit of FIG. 5a is shown.

In FIG. 5b the valve is a three-position valve 61', the single positions of which are attained by different control signals, which are generated by circuit 54 depending which sensor signals a locking tendency. Here the signals at the outputs of the distributor 55' are fed to the valve 61' via an OR-gate 63.

In FIG. 6 is shown an embodiment of a three-position valve such as represented in principle at 28 in FIG. 2. This valve may be connected to the pressure generator at 64, to the first brake circuit at 65, to the chamber 12 of FIG. 1 at 66 and to a return line at 67. The movable part of the valve is designated 68.

In the position represented in FIG. 6 the pressure in the first brake circuit and in the chamber 12 increases if the pressure in line 64 is increased. In the second position (movement to the right) the line 64 is closed while return line 67 is connected to line 66; thus the pressure in chamber 12 is reduced and the pressure in the first brake circuit is held constant because of the one-way valve 69. In the third position the valve 69 is opened by the movable part 68 and, at the same time, the connection between line 66 and line 67 is interrupted by means of the movable part 68 which closes valve 70. The control signals for the control winding 72, are applied to an input 71.

It will be understood that the above description of the present invention is susceptible to various modifications, changes and adaptations, and the same are intended to be comprehended within the meaning and range of equivalents of the appended claims.

What is claimed is:

1. In an anti-lock regulating system for brakes associated with wheels, having a first brake circuit including the brake of at least one wheel; a braking pressure regulating device for regulating the braking pressure when the wheels have a tendency to lock; a hydraulic braking pressure generator means coupled to the first brake circuit through the braking pressure regulating device; the improvement comprising
   a. a second brake circuit including the brake of at least one other wheel;
   b. a hydraulic control valve connecting said second brake circuit with said hydraulic braking pressure generator means; said hydraulic control valve having a normally open position and a closed position;
   c. a control piston having opposite first and second faces;
   d. means for exposing said first face of said control piston to a pressure $P_R'$ which is dependent from the braking pressure $P_R$ prevailing in said second brake circuit;
   e. means defining a control chamber bounded by said second face of said control piston;
   f. a throttle means connecting said braking pressure regulating device with said control chamber;
   g. means for exposing said second face of said control piston to a pressure $P_{St}'$ which is dependent, through said throttle means, from the pressure $P_{St}$ as set by said braking pressure regulating device;
   h. means connecting said control piston with said hydraulic control valve; said control piston, in response to a predetermined ratio $P_R'/P_{St}'$ on said faces, being displaced for first closing said control valve and subsequently, as a result of a continuing displacement, effecting an increase in the volume accommodating hydraulic fluid between said hydraulic control valve and the wheel brake of said second brake circuit;
   i. a bypass conduit connecting the hydraulic braking pressure generator means with said second brake circuit with the circumvention of said hydraulic control valve;
   j. a bypass valve in said bypass conduit for controlling the same; and
   k. means for normally maintaining open said bypass valve and for closing said bypass valve for duration of braking pressure regulation, whereby a more rapid pressure buildup in said second brake circuit is effected when said bypass valve is open.

2. An anti-lock regulating system as defined in claim 1, wherein said bypass valve has a control chamber; the improvement further comprising a return conduit communicating with said control chamber and means coupling said return conduit to said first brake circuit for effecting a closing of said bypass valve by means of hydraulic fluid from said first brake circuit during pressure regulation and for maintaining said bypass valve closed until pressure drops in said hydraulic braking pressure generator means.

3. An anti-lock regulating system as defined in claim 1, said throttle means comprises a throttle and a one-way valve connected parallel therewith.

4. An anti-lock regulating system as defined in claim 1, wherein each said brake circuit includes the brakes of the wheels of axially associated axles.

5. An anti-lock regulating system as defined in claim 4, wherein said first brake circuit includes the brakes of the front wheels of a vehicle.

6. An anti-lock regulating system as defined in claim 1, further comprising measuring valve transmitters for the control of the braking pressure, said measuring valve transmitters being responsive to the movement behavior of front wheels of a vehicle; the brakes of said front wheels being included in at least one of said brake circuits.

7. An anti-lock regulating system as defined in claim 6, wherein said braking pressure regulating device comprises means for effecting the braking pressure regulation when one of said front wheels shows a tendency to lock.

8. An anti-lock regulating system as defined in claim 7, further comprising means for switching over to a select-high operational mode from a select-low operational mode.

9. An anti-lock regulating system as defined in claim 6, wherein the vehicle has a rear axle; further comprising an additional measuring valve transmitter attached to said rear axle for effecting pressure regulation in the presence of a tendency to lock.

10. An anti-lock regulating system as defined in claim 6, wherein said braking pressure regulating device comprises means for using signals derived from said measuring value transmitters for regulating the pressure in the associated brake circuit.

11. An anti-lock regulating system as defined in claim 6, further including a single-channel evaluation circuit and means for connecting in timed sequence said measuring value transmitters to said evaluation circuit.

12. An anti-lock regulating system as defined in claim 11, further comprising switch means for applying control signals derived from the individual measuring value transmitters to control circuits of the braking pressure regulating device.

13. An anti-lock regulating system as defined in claim 1, wherein said hydraulic braking pressure generator means includes a first hydraulic braking pressure generator associated with said first brake circuit and a second hydraulic braking pressure generator associated with said second brake circuit.

* * * * *